US008699614B2

United States Patent
Haartsen

(10) Patent No.: US 8,699,614 B2
(45) Date of Patent: Apr. 15, 2014

(54) APPARATUS AND METHOD FOR INTERFERENCE MITIGATION

(75) Inventor: Jacobus Cornelis Haartsen, Hardenberg (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 431 days.

(21) Appl. No.: 12/694,764

(22) Filed: Jan. 27, 2010

(65) Prior Publication Data
US 2010/0158174 A1 Jun. 24, 2010

Related U.S. Application Data

(62) Division of application No. 11/275,154, filed on Dec. 15, 2005.

(60) Provisional application No. 60/723,041, filed on Oct. 3, 2005.

(51) Int. Cl.
*H04B 15/00* (2006.01)

(52) U.S. Cl.
USPC ......................................... 375/285

(58) Field of Classification Search
USPC ......................................... 375/285
See application file for complete search history.

(56) References Cited

U.S. PATENT DOCUMENTS

| 6,035,213 A * | 3/2000 | Tokuda et al. ............ 455/553.1 |
| 6,807,405 B1 * | 10/2004 | Jagger et al. ................. 455/296 |
| 2007/0076782 A1 * | 4/2007 | McCorkle et al. ............ 375/130 |

FOREIGN PATENT DOCUMENTS

| JP | H01-320827 A | 12/1989 |
| JP | 2003-224483 A | 8/2003 |
| WO | WO 00/46929 A1 | 8/2000 |
| WO | WO 01/93482 A2 | 12/2001 |

OTHER PUBLICATIONS

U.S. Appl. No. 11/275,154, filed Apr. 5, 2007.

* cited by examiner

*Primary Examiner* — Chieh M Fan
*Assistant Examiner* — Tanmay Shah

(57) ABSTRACT

An apparatus in a wideband radio transceiver for mitigating interference between a wideband radio operating in a wide frequency band and a narrowband radio operating in a narrow frequency band within the wide frequency band. The effects of transmissions by the wideband radio on the narrowband radio are reduced by creating by the wideband radio, a transmitter notch of decreased transmit power centered at a frequency in the wide frequency band that is fixed in relation to the wideband carrier frequency. The wideband carrier frequency is then adjusted so that the transmitter notch is aligned with the second radio's narrow frequency band. The effects of transmissions by the narrowband radio on the wideband radio are reduced by creating by the wideband radio, a fixed receiver notch of decreased receiver gain in the wideband receiver, and aligning the narrowband signal with the fixed receiver notch.

4 Claims, 10 Drawing Sheets

F0-F1+Fnotch

FIG. 13
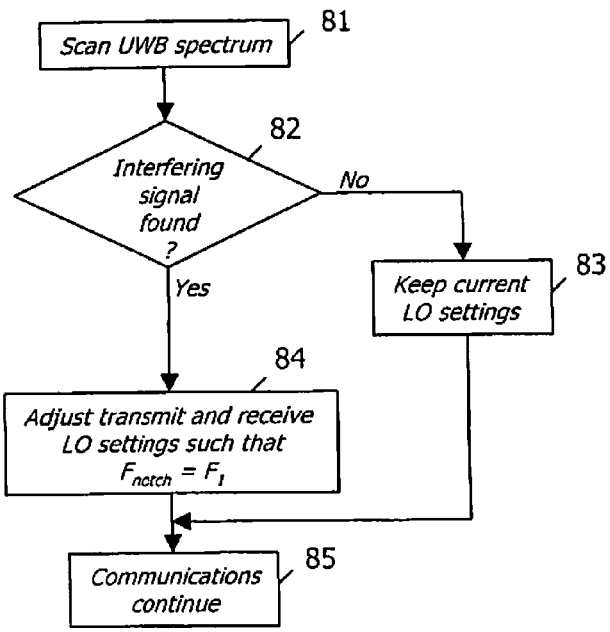
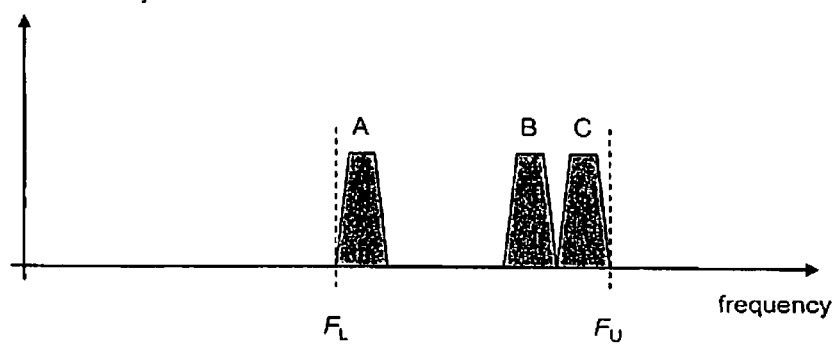
FIG. 14

APPARATUS AND METHOD FOR INTERFERENCE MITIGATION

RELATED APPLICATIONS

This application is a divisional application of a co-pending U.S. patent application Ser. No. 11/275,154 filed Dec. 15, 2005, which claims the benefit of Provisional Application No. 60/723,041 filed Oct. 3, 2005, the entire disclosures of which are incorporated herein by reference.

BACKGROUND

The present invention relates to radio communication systems. More particularly, and not by way of limitation, the present invention is directed to an apparatus and method for mitigating interference between radio users operating in the same frequency band.

Radio operations have recently been allowed in the frequency range 3.1-10.6 GHz. Instead of a fixed allocation of radio bands, the new radio transmissions will overlap with existing services. This is accomplished by the use of so-called Ultra Wideband (UWB) modulation techniques. A signal is denoted UWB when it either has a bandwidth of at least 500 MHz, or has a fractional bandwidth larger than 0.2. The transmit power is spread over a large frequency range, resulting in a low power spectral density (PSD) which is measured in dBm/MHz. The emission levels established by the FCC are rather low, resulting in a severe limitation of the range of UWB radio systems. UWB systems are therefore typically used in short-range systems providing Wireless Personal Area Networking (WPAN).

UWB emissions may interfere with the communication of other, narrower-band, systems operating in the 3.1-10.6 GHz band. However, these so-called victim systems have much narrower bandwidths, and therefore will experience the UWB emission as an increase in the noise floor. Systems that will be impacted by the UWB emission include Fixed Services (Wireless Local Loop) operating around 3.4 GHz, Wireless Local Area network (MAN) systems operating around 5 GHz, and envisioned cellular systems (beyond IMT-2000) that may operate at frequencies between 3 and 6 GHz.

There are several occasions in which the increase in noise floor in the victim receivers in not acceptable. When a mobile terminal is at a cell border or finds itself under heavy fading conditions, it may operate at the limit of its sensitivity. Any increase of the noise floor, caused by a UWB system, will result in an unacceptable performance degradation. Thus, in essence, the UWB emission reduces the range of the victim system. This range reduction can only be compensated for by using more base stations, which is not a desirable solution.

Many UWB developers are, therefore, working on interference mitigation techniques. Proposed solutions include having the UWB devices scan the frequency spectrum of interest, and when they detect an existing system (for example a Worldwide Interoperability for Microwave Access (WiMAX) system at 3.41 GHz), they avoid that part of the spectrum. This technique is called Detect-And-Avoid (DAA). Such avoidance, however, is not a trivial task. Since the UWB transmission is very wide (0.5-1 GHz), a notch must be created within the transmit spectrum. In addition, the notch must be deep enough (for example 30 dB or more) in order to limit the UWB emission at the frequency to be avoided. Furthermore, the location of the notch must be variable since the victim carrier frequency is not fixed.

The current UWB technologies can be divided into three classes:

a) Orthogonal Frequency Division Multiplexing (OFDM) based: this is an up-scaled OFDM technique with 128 sub-carriers and a carrier spacing of 4.125 MHz, rendering a total bandwidth of 528 MHz.

b) Direct-Sequence Spread Spectrum (DSSS) based: this technique uses chip rates on the order of 1-2 Gchips/s with variable spreading factors.

c) Pulse based: this technique uses very short pulses with a pulse duration that is a fraction of a nanosecond. Most pulse-based techniques use Pulse Position Modulation (PPM) to carry the information.

With the OFDM technique, variable notches with a depth of approximately 20 dB can be obtained by inactivation of specific sub-carriers. With more advanced techniques (for example, using a dummy sub-carrier to compensate), at most 30 dB can be obtained. In some cases, however, notches deeper than 30 dB may be required. For the DSSS and pulse-based techniques, variable notching is an even larger problem, making it much more difficult to obtain notch depths equivalent to those obtainable with OFDM. Use of the DSSS and pulse-based techniques is desirable, however, because in contrast to OFDM-based UWB, use of these techniques results in very low implementation costs.

A method and apparatus for adapting multi-band UWB signaling to interference sources is described in U.S. Patent Application Publication No. US 2004/0048574 (Walker et al.). However, Walker et al. do not disclose or suggest any methodology utilizing notches in a UWB spectrum to mitigate interference.

Thus, what is needed in the art is an apparatus and method for interference mitigation that overcomes the deficiencies of conventional systems and methods, and can be used with OFDM, DSSS, and pulse-based UWB techniques. The present invention provides such an apparatus and method.

SUMMARY

Rather than attempting to vary the frequency of a notch within the transmission frequency range of a UWB system to match the frequency of an interfering narrowband system, the present invention forms a notch at a fixed position relative to the carrier frequency of the UWB system. The carrier frequency is then varied so as to superimpose the notch over the frequency of the narrowband system. Such a fixed notch filter can obtain notch depths in excess of 30 dB. Therefore, the present invention can be used with all UWB technologies, including OFDM, DSSS, and pulse-based technologies.

Thus, in one aspect, the present invention is directed to a method of mitigating interference between a first radio operating in a wide frequency band and a second radio operating in a narrow frequency band within the wide frequency band. The method includes creating by the first radio, a transmitter notch of decreased transmit power centered at a selected frequency in the wide frequency band, wherein the selected frequency has a position in the wide frequency band that is fixed in relation to a wideband carrier frequency. The method then adjusts the wideband carrier frequency so that the transmitter notch is aligned with the second radio's narrow frequency band, thereby reducing interference that transmissions by the first radio cause for the second radio.

In another aspect, the present invention is directed to a method of decreasing interference on a radio operating in a wide frequency band from a narrowband signal within the wide frequency band. The method includes creating by the wideband radio, a fixed receiver notch of decreased receiver gain in the radio's wideband receiver, and aligning the narrowband signal with the fixed receiver notch. The aligning step may be accomplished by selecting a local oscillator (LO) frequency so that when the narrowband signal is down-converted from radio frequency (RF) to intermediate frequency (IF), the narrowband signal is aligned with the fixed receiver notch.

In another aspect, the present invention is directed to an apparatus in a wideband radio transceiver for mitigating interference between a wideband radio operating in a wide frequency band and a narrowband radio operating in a narrow frequency band within the wide frequency band. The apparatus includes a fixed notch filter for creating a transmitter notch of decreased transmit power centered at a selected frequency in the wide frequency band. The selected frequency has a position in the wide frequency band that is fixed in relation to the wideband carrier frequency. The apparatus also includes means for adjusting the wideband carrier frequency so that the transmitter notch is aligned with the narrowband radio's narrow frequency band, thereby reducing interference that transmissions by the wideband transceiver cause for the narrowband radio.

In another aspect, the present invention is directed to an apparatus in a wideband radio transceiver for mitigating interference on a wideband radio operating in a wide frequency band from a narrowband signal within the wide frequency band. The apparatus includes a fixed notch filter for creating a fixed receiver notch of decreased receiver gain in the wideband transceiver, and means for aligning the narrowband signal with the fixed receiver notch. The means for aligning may include means for selecting an LO frequency such that when the narrowband signal is down-converted from RF to IF, the narrowband signal is aligned with the fixed receiver notch.

In another aspect, the present invention is directed to a method of mitigating interference between a first radio operating in a wide frequency band and a plurality of narrowband radios operating at a plurality of carrier frequencies within the wide frequency band. The method includes determining a frequency range that encompasses the carrier frequencies of the plurality of narrowband radios; creating by the first radio, a transmitter notch of decreased transmit power centered at a notch frequency at a midpoint of the determined frequency range; and adjusting a transmitter notch bandwidth so that the bandwidth of the transmitter notch covers the determined frequency range.

In another aspect, the present invention is directed to a method of mitigating interference between a wideband radio operating in a wide frequency band and a plurality of narrowband signals transmitted at a plurality of carrier frequencies within the wide frequency band. The method includes determining the carrier frequency of each of the plurality of narrowband signals; determining a signal power of each of the plurality of narrowband signals; determining a notch frequency by determining an average of the carrier frequencies of the plurality of narrowband signals weighted by the signal power of each of the plurality of narrowband signals; and creating by the wideband radio, a receiver notch of decreased transmit power centered at the determined notch frequency.

In another aspect, the present invention is directed to an apparatus in a wideband radio for mitigating interference between the wideband radio and a plurality of narrowband radio signals transmitted at a plurality of carrier frequencies within the wideband radio's frequency band. The apparatus includes means for determining a frequency range that encompasses the carrier frequencies of the plurality of narrowband signals; a notch filter with a fixed notch frequency for creating a transmitter notch of decreased transmit power centered at a notch frequency at a midpoint of the determined frequency range; and means for adjusting a transmitter notch bandwidth so that the bandwidth of the transmitter notch covers the determined frequency range.

In another aspect, the present invention is directed to an apparatus in a wideband radio for mitigating interference between the wideband radio and a plurality of narrowband radio signals transmitted at a plurality of carrier frequencies within the wideband radio's frequency band. The apparatus includes means for determining the carrier frequency of each of the plurality of narrowband signals; means for determining a signal power of each of the plurality of narrowband signals; means for determining a notch frequency by determining an average of the carrier frequencies of the plurality of narrowband signals weighted by the signal power of each of the plurality of narrowband signals; and a notch filter with a fixed notch frequency for creating a receiver notch of decreased receiver gain centered at the determined notch frequency.

BRIEF DESCRIPTION OF THE SEVERAL VIEWS OF THE DRAWINGS

In the following section, the invention will be described with reference to exemplary embodiments illustrated in the figures, in which:

FIG. 13 is a flow chart illustrating the steps of an embodiment of the method of the present invention when a single narrowband interfering signal is found within the UWB receiver spectrum;

FIG. 14 is an illustrative drawing of a UWB receiver spectrum overlaying multiple narrowband interfering signals;

DETAILED DESCRIPTION

As noted above, making a notch at a variable frequency in the transmit spectrum of a UWB radio system, particularly a DSSS or pulse-based system, is a problem. Therefore, the present invention creates a notch at a frequency fixed in relation to the carrier frequency of the UWB system, and varies the carrier frequency instead to align the notch with the transmission frequency of the victim system. Since UWB devices are typically used for unlicensed, short-range use, in most situations only a single UWB channel is present. Coordination between multiple UWB channels is not required, because UWB units in range will most likely join the same channel. This obviates the need for a fixed carrier allocation. UWB devices can find each other by starting at one (or several) a priori known, fixed carrier frequency. However, after the DAA procedure, a notch is created in the spectrum and the total transmission spectrum is shifted so that the notch is aligned with the victim frequency.

The present invention minimizes the interference between the UWB transmitter and the victim receiver, as well as the interference between the victim transmitter and the UWB receiver. Like the UWB transmitter, the UWB receiver effectively notches out a fixed part of the received signal. Therefore, the required dynamic range of the UWB receiver is reduced because it does not have to deal with the strong signals from the victim transmitter.

Figure 1:
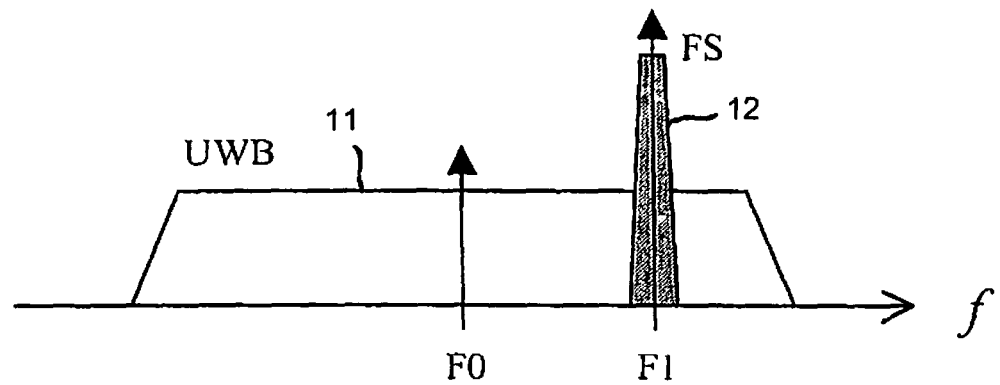
FIG. 1 is an illustrative drawing of a UWB transmitter spectrum overlaying a narrowband Fixed Services (FS) transmitter spectrum.

FIG. 1 is an illustrative drawing of a UWB transmitter spectrum 11 overlaying a narrowband Fixed Services (FS) transmitter spectrum 12. UWB radio communications utilize an extremely large bandwidth, in the order of 0.5-2 GHz. Thus with high probability, the UWB transmission will overlap with a narrowband radio signal such as the FS service spectrum. The UWB transmission is centered at $F_0$ whereas the FS transmission is centered at $F_1$. When in close range, the UWB emission will degrade the performance of the FS receiver. Conversely, in the UWB receiver stage, the FS transmitter may also interfere with or jam the UWB receiver.

Figure 2:
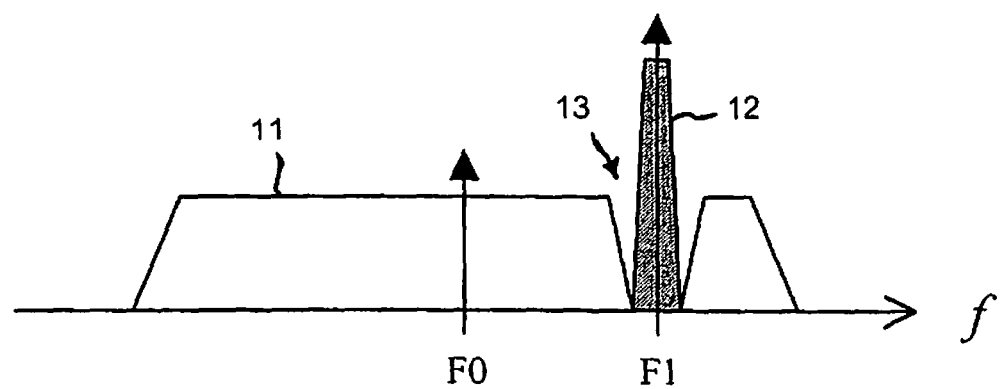
FIG. 2 is an illustrative drawing of the UWB transmitter spectrum of FIG. 1 overlaying the narrowband FS transmitter spectrum, and with a notch aligned with the FS frequency $F_1$.

FIG. 2 is an illustrative drawing of the UWB transmitter spectrum 11 overlaying the narrowband FS transmitter spectrum 12, and with a notch 13 aligned with the FS frequency $F_1$. For optimal coexistence, the UWB spectrum and the FS spectrum should be mutually exclusive. FIG. 2 shows how the UWB system has created a notch in the transmit spectrum around $F_1$ in order to permit an interference-free band for the FS system.

Figure 3:
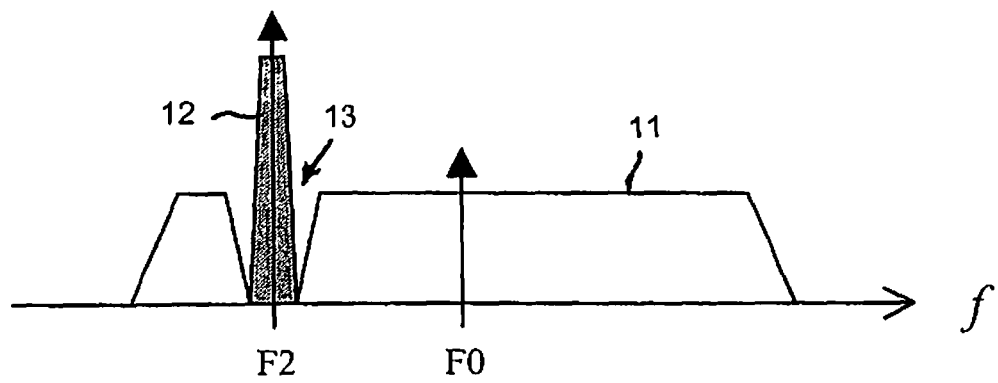
FIG. 3 is an illustrative drawing of the UWB transmitter spectrum of FIG. 1 overlaying the narrowband FS transmitter spectrum, and with the notch aligned with a new FS frequency $F_2$.

FIG. 3 is an illustrative drawing of the UWB transmitter spectrum 11 overlaying the narrowband FS transmitter spectrum 12, and with the notch 13 aligned with a new FS frequency $F_2$. Since the FS signal may switch from $F_1$ to $F_2$, the notch carrier frequency $F_{notch}$ must be variable in order to permit an interference-free band for the varying FS system. In practice, however, creation of a variable $F_{notch}$ is highly problematic. Variable notch filters are costly, difficult to achieve with on-chip components, and do not render deep notches of 30 dB or more without suppressing a large part of the received signal bandwidth.

Figure 4:
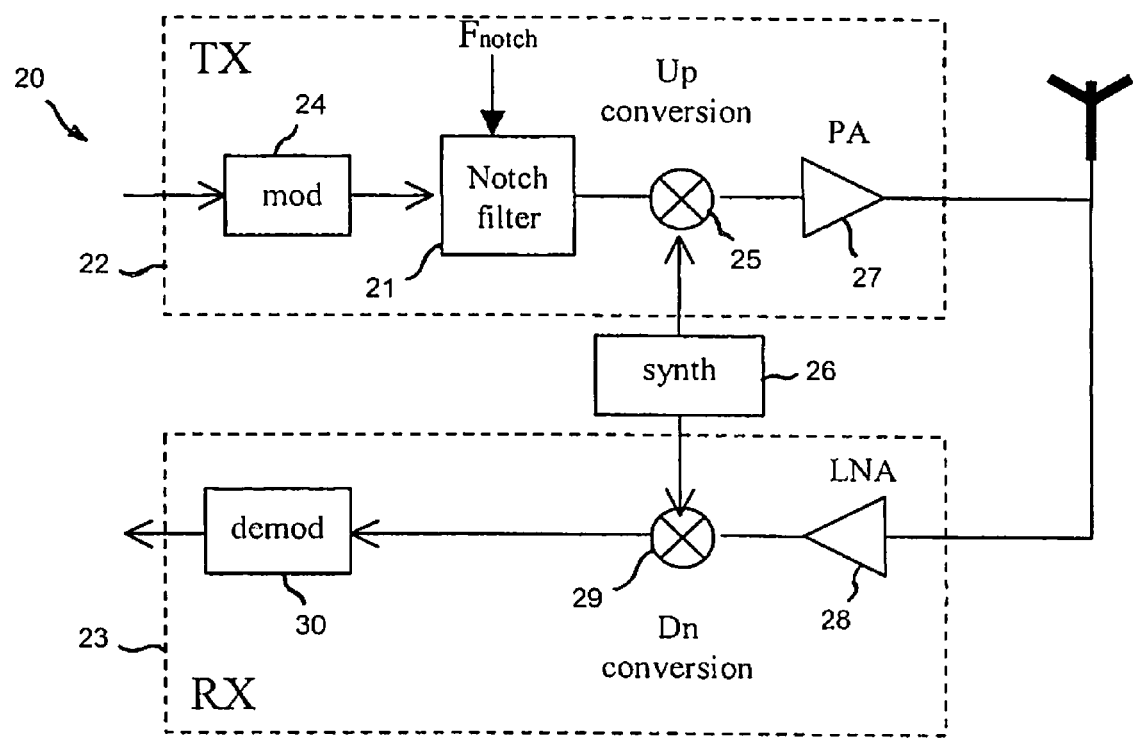
FIG. 4 (Prior Art) is a simplified block diagram of a typical UWB transceiver implemented with a variable transmitter notch filter.

FIG. 4 is a simplified block diagram of a typical UWB transceiver 20 implemented with a variable transmitter notch filter 21. The transceiver includes a transmitter stage 22 and a receiver stage 23. The transmitter stage includes a modulator 24, the variable notch filter 21, an up converter 25 connected to a synthesizer 26 for conversion from an intermediate frequency (IF) to RF, and a power amplifier 27. Preferably, the variable notch filter is built at the IF stage or at base band because it is not practical to build a variable notch filter at RF. In this embodiment, the receiver stage 23 is a conventional UWB receiver stage having a low noise amplifier (LNA) 28, a down converter 29 connected to the synthesizer 26, and a demodulator 30.

Figure 5:
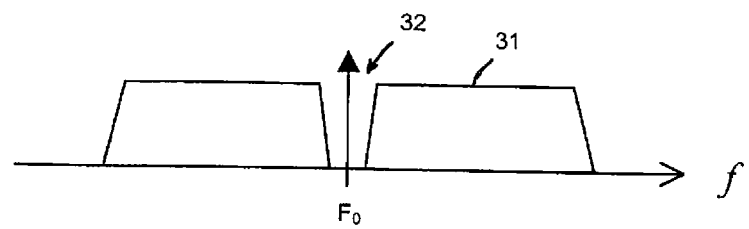
FIG. 5 is an illustrative drawing of a UWB transmitter spectrum with a fixed notch aligned with the UWB carrier frequency $F_0$ in accordance with the teachings of the present invention.

FIG. 5 is an illustrative drawing of a UWB transmitter spectrum 31 with a fixed notch 32 aligned with the UWB carrier frequency $F_0$ in accordance with the teachings of the present invention. Because of the difficulties in implementing a variable notch filter, the present invention utilizes a fixed notch carrier instead. Preferably, the notch is in the middle of the spectrum as is shown in FIG. 5, but any other fixed location (relative to the UWB carrier frequency $F_0$) may also be utilized. Such a notch may be created in the transmitter stage, for example, by a high-pass filter at base band. Alternatively, the notch may be created by a (fixed) high-Q filter at IF. The base band or IF signal is then up-converted to RF utilizing an LO frequency such that the resulting notch frequency $F_{notch}$ coincides with the victim carrier frequency.

Figure 6:
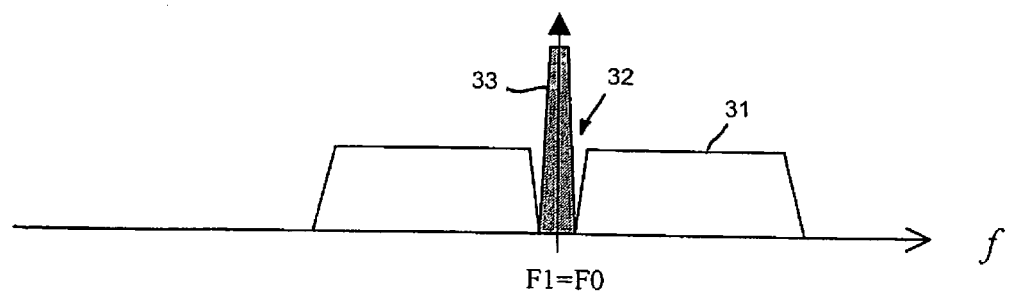
FIG. 6 is an illustrative drawing of the UWB transmitter spectrum of FIG. 5 with the fixed notch aligned with the UWB carrier frequency $F_0$, and with $F_0$ positioned at an FS frequency $F_1$ in accordance with the teachings of the present invention.

FIG. 6 is an illustrative drawing of the UWB transmitter spectrum 31 with the fixed notch 32 aligned with the UWB carrier frequency $F_0$, and with $F_0$ positioned at $F_1$, the frequency of a narrowband FS spectrum 33, in accordance with the teachings of the present invention. Thus, in this example, the notch frequency $F_{notch}$ is identical to the UWB center frequency $F_0$, and the victim system spectrum 33 is centered at $F_1$. When the UWB centre frequency is placed at $F_1$, then $F_{notch}=F_0=F_1$, and an interference-free band for the FS system is created at $F_1$.

Figure 7:
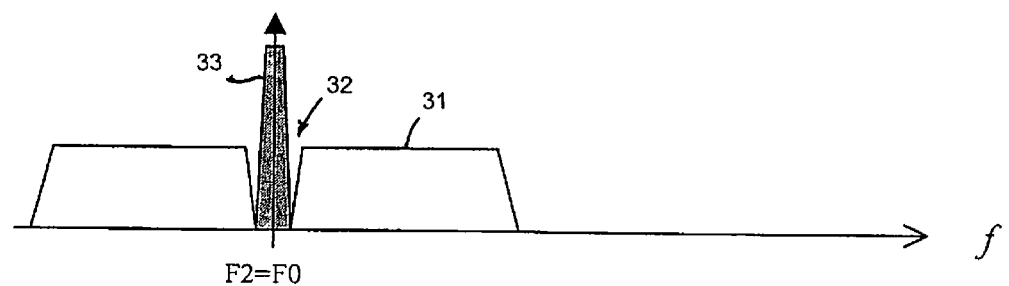
FIG. 7 is an illustrative drawing of the UWB transmitter spectrum of FIG. 5 with the fixed notch aligned with the UWB carrier frequency $F_0$, and with $F_0$ positioned at an FS frequency $F_2$ in accordance with the teachings of the present invention.

FIG. 7 is an illustrative drawing of the UWB transmitter spectrum 31 with the fixed notch 32 aligned with the UWB carrier frequency $F_0$, and with $F_0$ positioned at an FS frequency $F_2$, in accordance with the teachings of the present invention. Thus, in this example, the notch frequency $F_{notch}$ is identical to the UWB center frequency $F_0$, and the victim system spectrum 33 is centered at $F_2$. When the UWB centre frequency is placed at $F_2$, then $F_{notch}=F_0=F_2$, and an interference-free band for the FS system is created at $F_2$.

Figure 8:
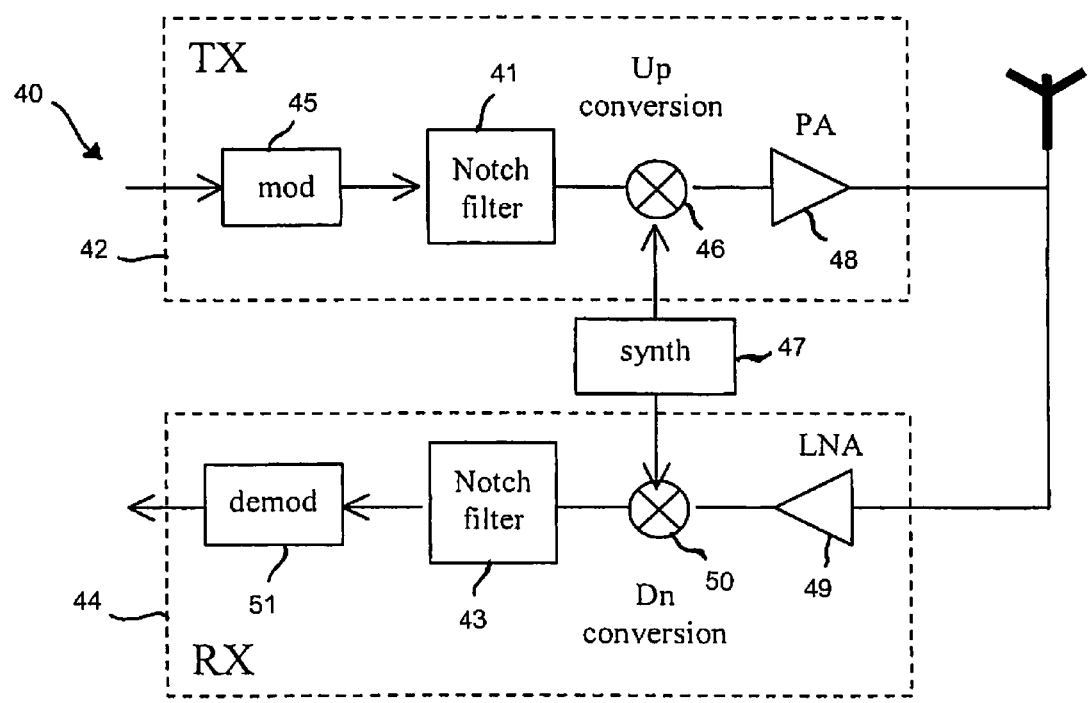
FIG. 8 is a simplified block diagram of a first exemplary embodiment of the present invention in which a UWB transceiver is implemented with fixed notch filters in the transmitter stage and the receiver stage.

FIG. 8 is a simplified block diagram of a first exemplary embodiment of the present invention in which a UWB transceiver 40 is implemented with a fixed notch filter 41 in the transmitter stage 42, and a fixed notch filter 43 in the receiver stage 44. The transmitter stage includes a modulator 45, the fixed transmitter notch filter 41, an up converter 46 connected to a synthesizer 47 for conversion from IF to RF, and a power amplifier 48. Preferably, the fixed notch filter 41 is built at the IF stage or at base band. In this embodiment, the receiver stage 44 has also been implemented with a fixed notch filter 43 in order to reduce the FS signal that interferes with or jams the UWB received signal. Thus, the receiver stage includes an LNA 49, a down converter 50 connected to the synthesizer 47, the receiver fixed notch filter 43, and a demodulator 51.

Since the notch filters in FIG. 8 are fixed, such filters can easily be realized with depths of 30 dB or more. Note that the notch filters are fixed implementations and do not need variable notch carriers as was the case in the implementation shown in FIG. 4. The up-conversion and down-conversion takes care of the alignment of the notch with the victim frequency. Note that the notch filters 41 and 43 may still be configurable. However, it is not the notch carrier frequency, but rather the notch bandwidth that may be variable. The latter is simpler to achieve than changing the carrier. The notch bandwidth may be varied, depending on the width of the frequency band to be avoided.

Figure 9:
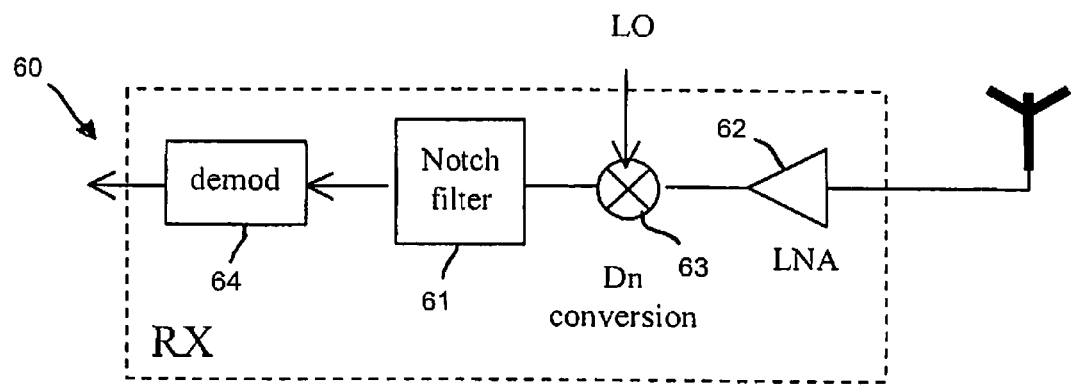
FIG. 9 is a simplified block diagram of a second exemplary embodiment of the present invention in which a UWB receiver is implemented with a fixed notch filter for mitigating interference from a narrowband jammer within the UWB spectrum.

FIG. 9 is a simplified block diagram of a second exemplary embodiment of the present invention in which an exemplary UWB receiver 60 is implemented with a fixed notch filter 61 for mitigating interference from a narrowband jammer within the UWB spectrum. The filter 61 has a fixed notch at $F_{notch}$. In the embodiment described above, both the UWB transmitter and the UWB receiver are re-tuned to a new carrier frequency. In the embodiment illustrated in FIG. 9, the RF frequency is changed only in the UWB receiver. This approach reduces the interference of a narrowband jammer in the UWB receiver, but does not suppress interference in the narrowband system resulting from the UWB transmissions.

Figure 10:
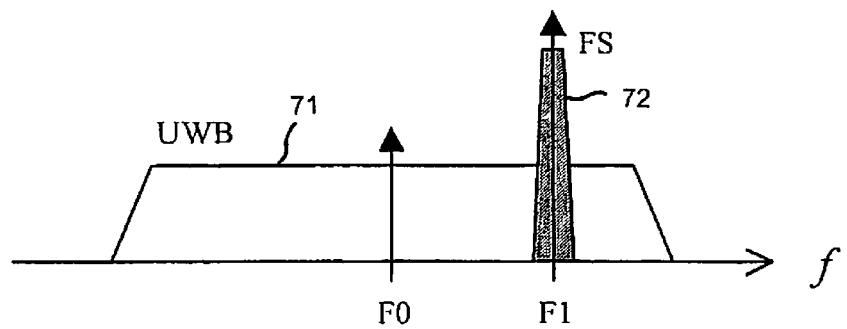
FIG. 10 is an illustrative drawing of a UWB receiver spectrum overlaying a narrowband FS jammer spectrum.

FIG. 10 is an illustrative drawing of a UWB receiver spectrum 71 overlaying a narrowband FS jammer spectrum 72. As is shown, the jammer is not at the UWB center frequency $F_0$ as would be configured with the previous embodiment, but at some frequency $F_1 > F_0$.

In the receiver embodiment shown in FIG. 9, the local oscillator (LO) frequency F_LO of the first mixer in the UWB receiver is tuned such that the jammer frequency $F_1$ is aligned with the fixed (IF) notch frequency. After the first mixer stage at 62, the RF signal is down-converted at 63 to an IF frequency (or to complex base band). However, instead of selecting an LO frequency to down-convert the UWB center frequency to an appropriate IF frequency, the LO frequency is selected to down-convert the jammer frequency $F_1$, and align $F_1$ with the fixed notch frequency $F_{notch}$. Thus, $F\_LO=F_1-F_{notch}$. In a second down-conversion stage (not shown), the signal (with suppressed jammer) may be converted to an IF, which is more suitable for carrying out functions such as channel filtering. This may also be done in the digital domain. Since the jammer has been suppressed by the notch filter, the dynamic range of the signal is reduced, and the requirements on the analog-to-digital converters (ADCs) are relaxed. After applying the fixed notch filter 61, the received signal is passed to a demodulator 64.

Figure 11A:
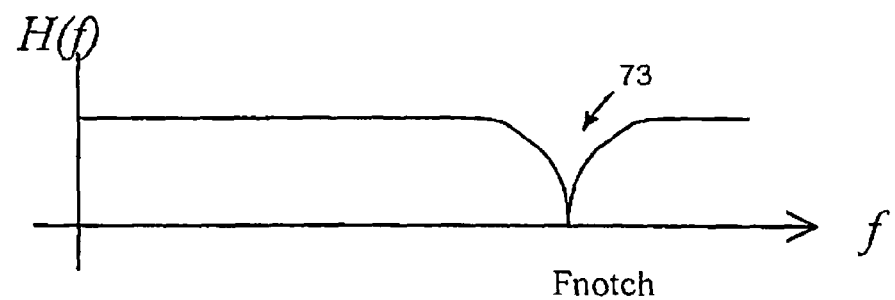
FIG. 11A is an illustrative drawing showing the (fixed) frequency response H(f) of the notch filter in the receiver of FIG. 9, with the notch at $F_{notch}$.
Figure 11B:
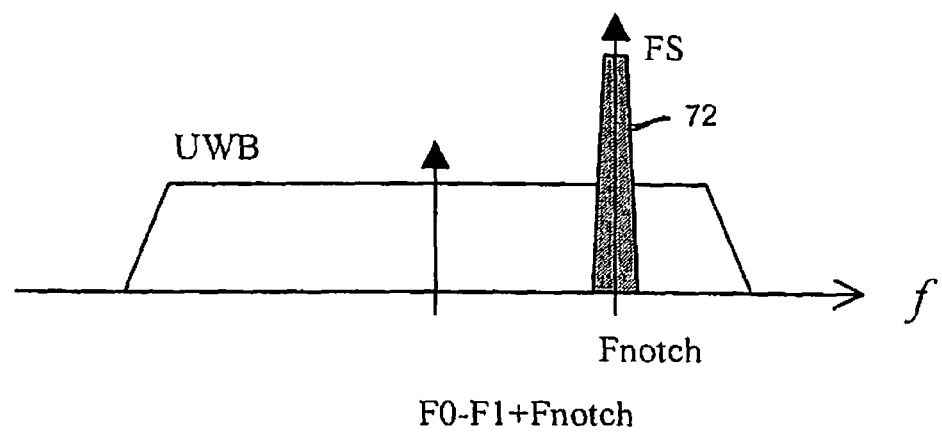
FIG. 11B is an illustrative drawing showing the down-converted received signal after the first mixer of the receiver of FIG. 9.
Figure 11C:
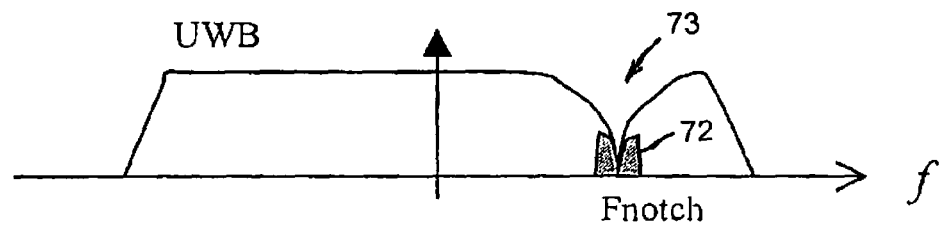
FIG. 11C is an illustrative drawing showing the resulting reduction of the jammer signal after filtering by the receiver of FIG. 9.

FIGS. 11A-11C illustrate the effect of the receiver architecture of FIG. 9 on a narrowband jammer signal 72. FIG. 11A is an illustrative drawing showing the (fixed) frequency response H(f) of the notch filter 61 in the receiver of FIG. 9, with the notch 73 at $F_{notch}$. FIG. 11B is an illustrative drawing showing the down-converted received signal after the first mixer. Finally, FIG. 11C is an illustrative drawing showing the resulting reduction of the jammer signal after filtering by the receiver of FIG. 9.

In the embodiment of FIGS. 9-11, it may be advantageous to have the notch frequency in the center of the UWB spectrum. In that way, the notch filtering can easily be combined with channel filtering. Also, when using base band processing, the notch filter can be realized with a high-pass filter. Thus, a third embodiment of the present invention combines aspects of the first and second embodiments above. In this embodiment, notch filtering is only applied in the receiver (as in the second embodiment). The LO in the receiver 60 (FIG. 9) makes sure the jammer center frequency $F_1$ coincides with the notch frequency $F_{notch}$. In addition, the receiver may also order the transmitter to center its carrier frequency $F_0$ on the notch frequency $F_{notch}$ (as in the first embodiment), where $F_{notch}=F_1$, the narrowband jammer carrier frequency.

Figure 12A:
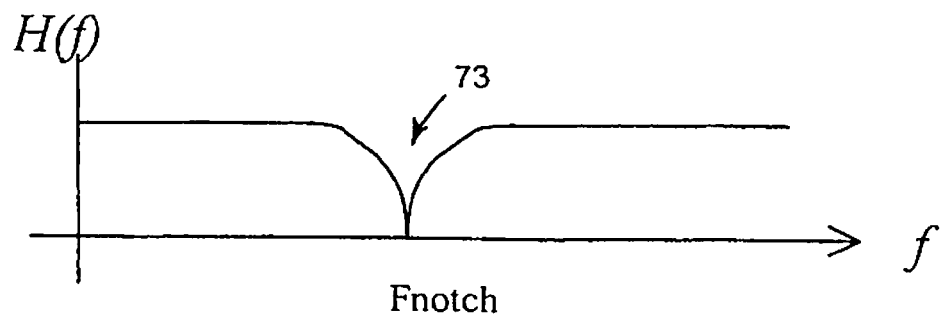
FIG. 12A is an illustrative drawing showing the (fixed) frequency response H(f) of the notch filter in the receiver of FIG. 9, with the notch at $F_{notch}$, at the center of the UWB spectrum.
Figure 12B:
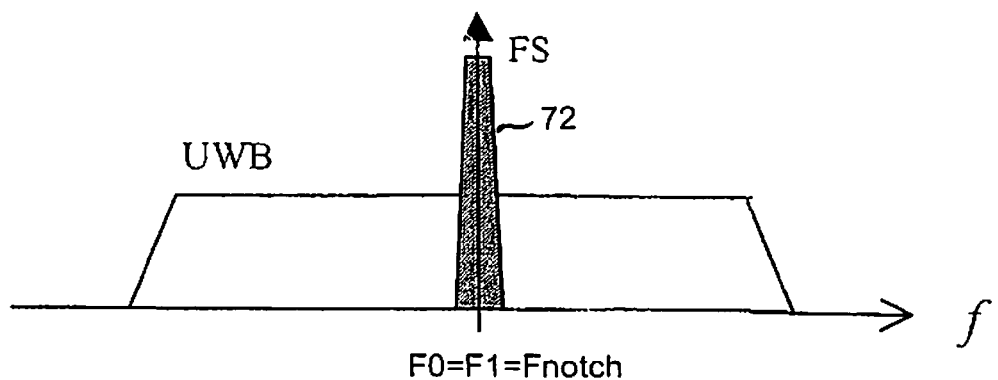
FIG. 12B is an illustrative drawing showing the down-converted received signal after the first mixer, with the UWB spectrum centered on $F_{notch}$ and wherein $F_0=F_1=F_{notch}$.
Figure 12C:
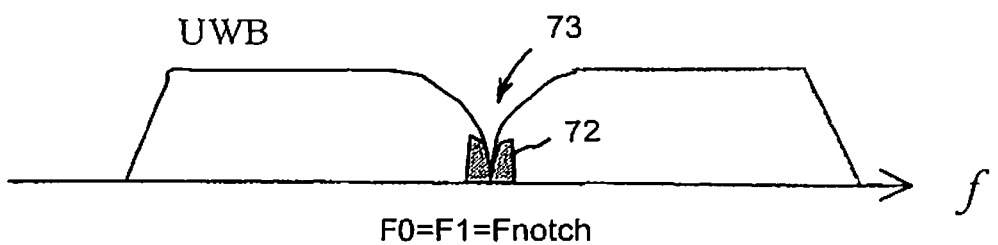
FIG. 12C is an illustrative drawing showing the resulting reduction of the jammer signal after filtering by the receiver of FIG. 9, with the UWB spectrum centered on $F_{notch}$ and wherein $F_0=F_1=F_{notch}$.

FIG. 12A is an illustrative drawing showing the (fixed) frequency response H(f) of the notch filter 61 in the receiver of FIG. 9, with the notch at $F_{notch}$, at the center of the UWB spectrum. FIG. 12B is an illustrative drawing showing the down-converted received signal after the first mixer, with the UWB spectrum centered on $F_{notch}$ and wherein $F_0=F_1=F_{notch}$. Finally, FIG. 12C is an illustrative drawing showing the resulting reduction of the jammer signal 72 after filtering by the receiver of FIG. 9, with the UWB spectrum centered on $F_{notch}$ and wherein $F_0=F_1=F_{notch}$.

In the present invention, the notch frequency $F_{notch}$ in the UWB transmit spectrum is aligned with the narrowband jammer frequency $F_1$. To find the jammer frequency, the transceiver first has to scan the spectrum for energy. The scanning may be carried out by one or by multiple transceivers. When multiple transceivers are utilized, the findings are forwarded to a single master unit. The transceivers may communicate with the master unit in a conventional manner. Extra robustness may be applied (for example, retransmissions, Forward Error Correction (FEC) coding, low rate modulation, and the like) to reduce the impact of the jammer.

FIG. 13 is a flow chart illustrating the steps of an embodiment of the method of the present invention when a single narrowband interfering signal is found within the UWB spectrum. At step 81, one or more UWB transceivers scan the UWB spectrum for energy. The energy measurements may be sent to a master unit, which determines at step 82 whether a narrowband interfering signal was found. If not, the method moves to step 83 and keeps the current LO settings. However, if a narrowband interfering signal was found, the method moves to step 84 where the LO settings are adjusted such that $F_{notch}=F_1$. The LO setting in the UWB transmitter may be adjusted so that UWB transmissions do not interfere with the narrowband user. Likewise, the LO setting in the UWB receiver may be adjusted so that transmissions by the narrowband user do not interfere with the UWB receiver. Thus, at step 85, communications continue by both the UWB user and the narrowband user without any, or with greatly reduced, mutual interference.

The situation may also arise in which multiple narrowband interfering signals are found at different frequencies within the UWB spectrum. A scenario showing three such interfering signals is illustrated in FIG. 14. In this scenario, the three interfering signals are of approximately equal magnitude, but are not evenly spaced in the frequency spectrum. The three signals are bounded at the lower end by frequency $F_L$ and at the upper end by frequency $F_U$.

Figure 15:
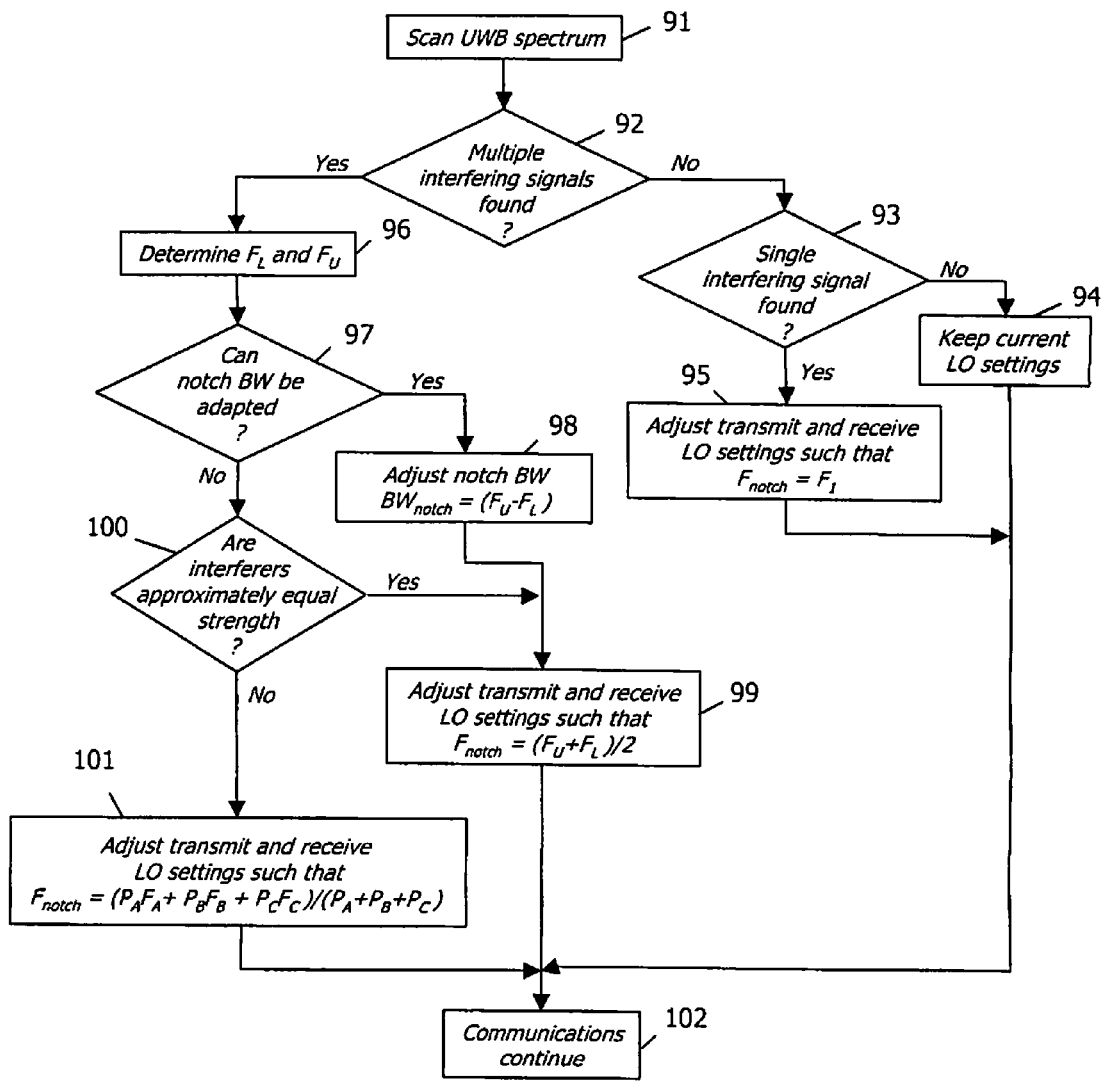
FIG. 15 is a flow chart illustrating the steps of an embodiment of the method of the present invention when multiple narrowband interfering signals are found at different frequencies within the UWB spectrum.

FIG. 15 is a flow chart illustrating the steps of an embodiment of the present invention when multiple narrowband interfering signals are found at different frequencies within the UWB spectrum. At step 91, one or more UWB transceivers scan the UWB spectrum for energy. The energy measurements may be sent to a master unit, which determines at step 92 whether multiple narrowband interfering signals were found. If not, the method moves to step 93 and determines whether a single interfering signal was found. If no interfering signals were found, the method moves to step 94 and keeps the current LO settings. Communications then continue at step 102. However, if a single narrowband interfering signal was found, the method moves to step 95 where the LO settings are adjusted such that $F_{notch}=F_1$. Communications then continue at step 102.

If it was determined at step 92 that multiple narrowband interfering signals were found, the method moves to step 96 where a lower frequency boundary $F_L$ and an upper frequency boundary $F_U$ are determined. At step 97, it is determined whether the notch bandwidth can be adapted. If so, the method moves to step 98 where the notch bandwidth is adjusted to equal the range from $F_L$ to $F_U$ (i.e., $BW_{notch}=(F_U-F_L)$). At step 99, the notch is set up at the midpoint between $F_L$ and $F_U$ by adjusting the transmit and receive LO settings such that:

$$F_{notch} = \frac{F_U + F_L}{2}.$$

Communications then continue at step 102. However, if it is determined at step 97 that the notch bandwidth cannot be adapted, the present invention moves to step 100 where it is determined whether the interferers have approximately equal signal strength.

Figure 16:
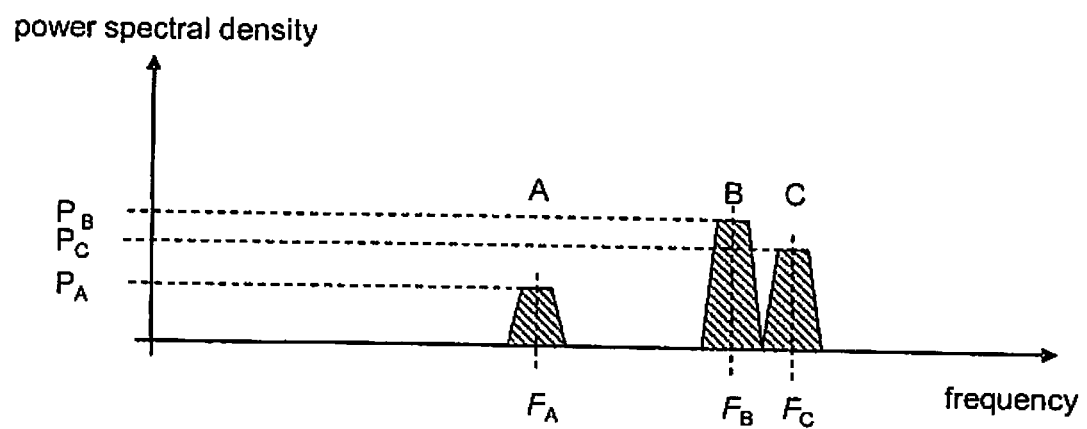
FIG. 16 is an illustrative drawing of three narrowband interfering signals of unequal strength within the UWB spectrum.

Referring briefly to FIG. 16, a scenario is illustrated in which three narrowband interfering signals of unequal strength are found within the UWB spectrum. Signals A, B, and C are shown to be at carrier frequencies $F_A$, $F_B$, and $F_C$, and have power levels at $P_A$, $P_B$, and $P_C$, respectively.

Referring again to FIG. 15, if the interferers have approximately equal signal strength at step 100, the method moves to step 99 and sets the notch frequency $F_{notch}$, at the midpoint between $F_L$ and $F_U$. Communications then continue at step 102. However, if the interferers do not have approximately equal signal strength, the method moves instead to step 101 and skews the notch frequency towards the stronger jammers by weighting each of the narrowband carrier frequencies with the received signal power of each signal. Thus, in the example of FIG. 16:

$$Fnotch = \frac{P_A F_A + P_B F_B + P_C F_C}{P_A + P_B + P_C}$$

For N jammers, this can be generalized to:

$$Fnotch = \frac{\sum_{i=1}^{N} P_i F_i}{\sum_{i=1}^{N} P_i}$$

Thus, for the example shown in FIG. 16, $F_{notch}$ will not be half way between $F_U$ and $F_L$, but will be closer to $F_B$. In case no individual jammer frequencies $F_A$, $F_B$, . . . can be identified, the notch frequency can also be determined by:

$$Fnotch = \frac{\int_{FL}^{F_U} f \cdot P(f) df}{\int_{FL}^{F_U} P(f) df}$$

At step 102, communications continue by the UWB user and the narrowband users without any, or with greatly reduced, mutual interference.

As described herein, the present invention provides efficient, low-cost, and low-power interference mitigation techniques. The invention additionally provides high performance with deep notch filters. The invention not only reduces interference to incumbent radio systems, but also improves the reception of UWB signals.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of decreasing interference in a radio network in which a wideband radio transmits and receives a wideband signal in a wide frequency band and a narrowband radio transmits and receives a narrowband signal within the wide frequency band, said method comprising:
   decreasing interference to the wideband radio caused by the narrowband signal by performing in a receiver of the wideband radio, the following steps:
      creating by the wideband radio, a fixed receiver notch of decreased receiver gain at a selected frequency in the wideband radio's wideband receiver; and
      utilizing a local oscillator (LO) frequency such that when the narrowband radio's narrowband signal is down-converted from radio frequency (RF) to intermediate frequency (IF), the narrowband radio's down-converted signal is aligned with the frequency of the receiver notch; and
   decreasing interference to the narrowband radio caused by the wideband signal by performing in the wideband radio, the following steps:
      reporting by the wideband receiver to a wideband transmitter, the fixed receiver notch frequency; and
      centering the wideband transmitter's carrier frequency on the fixed receiver notch frequency to reduce interference to the narrowband radio.

2. In a wideband radio that transmits and receives a wideband signal in a wide frequency band, an apparatus for mitigating interference to and from a narrowband radio transmitting a narrowband signal within the wide frequency band, said apparatus comprising:
   a first circuit configured to decrease interference to the wideband radio caused by the narrowband signal, the first circuit comprising:
      a notch filter with a fixed notch frequency for creating a fixed receiver notch of decreased receiver gain; and
      a local oscillator (LO) set to a frequency such that when the narrowband signal is down-converted from radio frequency (RF) to intermediate frequency (IF), the down-converted signal is aligned with the frequency of the receiver notch; and a second circuit configured to decrease interference to the narrowband radio caused by the wideband signal, wherein the second circuit is configured to:

report to a wideband radio transmitter, the fixed receiver notch frequency; and center the wideband transmitter's carrier frequency on the fixed receiver notch frequency to reduce interference to the narrowband radio.

3. A method of mitigating interference between a wideband radio operating in a wide frequency band and a plurality of narrowband signals transmitted at a plurality of carrier frequencies within the wide frequency band, said method comprising:

mitigating interference to the plurality of narrowband signals caused by transmissions from the wideband radio by performing the steps of:

determining a frequency range that encompasses the carrier frequencies of the plurality of narrowband signals;

creating by the wideband radio, a transmitter notch of decreased transmit power centered at a notch frequency at a midpoint of the determined frequency range; and adjusting a transmitter notch bandwidth so that the bandwidth of the transmitter notch covers the determined frequency range; and mitigating interference to the wideband radio caused by transmissions from the plurality of narrowband signals by performing the steps of:

creating by the wideband radio, a receiver notch of decreased receiver gain centered at the notch frequency; and adjusting a receiver notch bandwidth so that the bandwidth of the receiver notch covers the determined frequency range.

4. In a wideband radio operating in a wide frequency band, an apparatus for mitigating interference between the wideband radio and a plurality of narrowband radio signals transmitted at a plurality of carrier frequencies within the wide frequency band, said apparatus comprising:

means for mitigating interference to the plurality of narrowband signals caused by transmissions from the wideband radio, comprising:

means for determining a frequency range that encompasses the carrier frequencies of the plurality of narrowband signals;

a notch filter with a fixed notch frequency for creating a transmitter notch of decreased transmit power centered at a notch frequency at a midpoint of the determined frequency range; and means for adjusting a transmitter notch bandwidth so that the bandwidth of the transmitter notch covers the determined frequency range; and means for mitigating interference to the wideband radio caused by transmissions from the plurality of narrowband signals, comprising:

a second notch filter with a fixed notch frequency for creating by the wideband radio, a receiver notch of decreased receiver gain centered at the notch frequency; and means for adjusting a receiver notch bandwidth so that the bandwidth of the receiver notch covers the determined frequency range.

* * * * *

UNITED STATES PATENT AND TRADEMARK OFFICE
CERTIFICATE OF CORRECTION

PATENT NO.       : 8,699,614 B2  
APPLICATION NO.  : 12/694764  
DATED            : April 15, 2014  
INVENTOR(S)      : Haartsen Page 1 of 1

It is certified that error appears in the above-identified patent and that said Letters Patent is hereby corrected as shown below:

In the Specification

In Column 1, Line 40, delete "(MAN)" and insert -- (WLAN) --, therefor.

In Column 3, Line 3, delete "(RE)" and insert -- (RF) --, therefor.

Signed and Sealed this  
Second Day of September, 2014

Michelle K. Lee  
*Deputy Director of the United States Patent and Trademark Office*